US006610785B1

United States Patent
Cecchin et al.

(10) Patent No.: US 6,610,785 B1
(45) Date of Patent: Aug. 26, 2003

(54) THERMOPLASTIC OLEFIN ELASTOMERS AND PROCESS FOR THEIR PREPARATION

(75) Inventors: Giuliano Cecchin, Ferrara (IT); Enea Garagnani, Ferrara (IT)

(73) Assignee: Montell North America Inc., Wilmington, DE (US)

( * ) Notice: Subject to any disclaimer, the term of this patent is extended or adjusted under 35 U.S.C. 154(b) by 0 days.

(21) Appl. No.: 08/437,489

(22) Filed: May 9, 1995

Related U.S. Application Data

(63) Continuation of application No. 08/167,261, filed on Dec. 15, 1993, now abandoned.

(30) Foreign Application Priority Data

Dec. 15, 1992 (IT) .......................................... MI92A2855

(51) Int. Cl.$^7$ .............................. C08F 8/00; C08L 9/00; C08L 23/04; C08L 45/00
(52) U.S. Cl. .................... 525/191; 525/193; 525/194; 525/211; 525/232; 525/240
(58) Field of Search ................. 525/193, 240, 525/191, 194, 211, 232

(56) References Cited

U.S. PATENT DOCUMENTS

| | | | | |
|---|---|---|---|---|
| 3,806,558 A | * | 4/1974 | Fischer ....................... | 525/240 |
| 4,087,485 A | | 5/1978 | Huff ....................... | 260/897 A |
| 4,634,740 A | | 1/1987 | Fujita et al. ................. | 525/240 |
| 4,650,830 A | * | 3/1987 | Yonekura et al. ........... | 525/194 |
| 4,785,045 A | * | 11/1988 | Yonekura et al. ........... | 525/194 |
| 4,916,180 A | * | 4/1990 | Robinson et al. ........... | 524/456 |
| 4,948,840 A | * | 8/1990 | Berta ......................... | 525/193 |
| 4,985,502 A | | 1/1991 | Izumi et al. ................. | 525/194 |
| 5,023,300 A | | 6/1991 | Huff et al. .................. | 525/194 |
| 5,143,978 A | | 9/1992 | Berta ......................... | 525/240 |
| 5,602,203 A | * | 2/1997 | Hamanaka et al. ........... | 525/74 |

FOREIGN PATENT DOCUMENTS

| | | | | |
|---|---|---|---|---|
| EP | 171025 | * | 2/1986 | ................. 525/240 |
| EP | 0213289 | | 3/1987 | |
| EP | 0 390 451 A2 | | 10/1990 | |
| EP | 0 486 293 A2 | | 5/1992 | |

OTHER PUBLICATIONS

Leonard et al., "Thermoplastic Olefin Compositions", (Mar. 13, 1991) CA#114:229648.*

\* cited by examiner

*Primary Examiner*—Nathan M. Nutter

(57) ABSTRACT

Disclosed are thermoplastic elastomeric compositions include:

A) from 10 to 80% by weight of one or more crystalline polymer of propylene containing from 0.05 to 15% in moles of ethylenic unsaturation, or a mixture of the above polymer with a saturated thermoplastic olefin polymer in quantities lower than or equal to 80% by weight;

B) from 20 to 90% by weight of an unsaturated elastomeric olefin polymer;

the compositions having been dynamically cross-linked with a cross-linking agent which includes a free radical generator.

4 Claims, No Drawings

THERMOPLASTIC OLEFIN ELASTOMERS AND PROCESS FOR THEIR PREPARATION

This application is a continuation of application Ser. No. 08/167,261, filed Dec. 15, 1993 and now abandoned.

The present invention relates to thermoplastic elastomeric compositions obtained by mixing and dynamically cross-linking a thermoplastic olefin polymer, which comprises an unsaturated polyolefin, and an unsaturated elastomeric olefin polymer.

Thermoplastic elastomeric compositions obtained by mixing in the molten state a thermoplastic olefin polymer with an unsaturated elastomeric olefin polymer (such as an ethylene-propylene-diene rubber, known as EPDM) and dynamic cross-linking, such as the ones described in published European patent application 213 285 in the name of the Applicant, are known in the art. By dynamic cross-linking one means that the crows-linking agent is added to the polymers described above before or during mixing, and said mixing is continued in the molten state during the cross-linking stage. The practical interest of compositions thus obtained is due to the fact that, although they can be processed and molded with apparatus and processes typical of thermoplastic polymers, they supply products which have elastomeric characteristics that, without being high, are in fact satisfactory for many application sectors, such as the construction, automotive and appliance industries.

Now the Applicant has obtained some thermoplastic elasomeric olefin compositions that, while maintaining good processability, possess improved elastic characteristics, as can be seen by the particularly low compression set values.

Therefore, the present invention provides thermoplastic elastomeric compositions comprising:

A) from 10 to 80% by weight, preferably from 20 to 60%, of one or more crystalline polymer of propylene containing from 0.05 to 15% in moles, preferably from 0.1 to 10%, of ethylenic unsaturation (unsaturated polymer), or a mixture of the above polymer with a saturated thermoplastic olefin polymer in quantities lower than or equal to 80% by weight;

B) from 20 to 90% by weight, preferably from to 80%, of an unsaturated elastomeric olefin polymer;

said compositions having been dynamically cross-linked with a cross-linking agent comprising a free radical generator.

Examples of unsaturated polymers that can be used as component (A) are isotactic, or mostly isotactic, propylene polymers, preferably having an isotactic index in xylene at 20° C. greater than 70%, and copolymers of propylene with ethylene and/or $C_4$–$C_{10}$ α-olefins. The ethylene and/or $C_4$–$C_{10}$ α-olefin content in the copolymers is preferably from 1 to 30% by weight, more preferably from 1 to 20%.

Examples of $C_4$–$C_{10}$ α-olefins are (1-butene, 1-hexene, 1-octene, 4-methyl-1-pentene and 6,6-dimethyl-1-pentene.

The ethylene unsaturation in the above polymers can be introduced directly in synthesis, copolymerizing minor quantities of a conjugated or nonconjugated $C_4$–$C_{10}$ diene. Examples of the above dienes are: 1,3-butadiene, isoprene, 1,3-pentadiene, 1,4-hexadiene, dicyclopentadiene and 2-ethylidene-5-norbornene.

The synthesis of the polymers containing the unsaturation is carried out by known polymerization techniques with coordination catalysts, operating in liquid phase, or gas phase, or a liquid-gas phase. The catalysts used are coordination catalysts known in the art, preferably high yield and high stereospecificity ones, comprising a titanium compound supported on a magnesium halide, in particular $MgCl_2$.

In order to obtain the molar quantities oft ethylenic unsaturation mentioned above, one copolymerizes the same molar quantities of the above mentioned dienes.

Examples of the above mentioned polymerization processes are described in published European patent application n. 171 025, in the name of the Applicant. As explained in said European patent application, the conjugated dienes can be bonded to the polymer chains in position 1,2 or 1,4, so that the ethylenic unsaturation is present along the chain (position 1,4) or in branched groups (position 1,2). By using the coordination catalysts mentioned above, one generally obtains introductions of the conjugated diene both in 1,2 position and 1,4 position.

Also included within the definition of the present invention are the thermoplastic elastomeric compositions wherein part of the unsaturated polymer constituting component (A) is substituted by a saturated thermoplastic olefin polymer. This way one obtains a mixture of a saturated and an unsaturated polymer. Examples of the above mentioned saturated polymers are the ethylene homopolymers, and the crystalline copolymers of ethylene with α-olefins, such as HDPE, LLDPE, LDPE, or with other nonhydrocarbon monomers, such as vinyl acetate, acrylic acid, methacrylic acid, acrylic and met acrylic esters, maleic anhydride, or homopolymers and copolymers of the types previously defined for component (A), where no ethylenic unsaturation is introduced.

In order to obtain the best elastic properties in the final compositions, it is best if the saturated polymers do not constitute over 50% by weight of component (A) in the formulations defined above.

Examples of elastomeric olefin polymers that can be used as component (B) are the mainly amorphous terpolymers of ethylene, containing from 20 to 80% by weight of propylene and or $C_4$–$C_{10}$ α-olefins, and from 0.5 to 15% by weight of a conjugated or nonconjugated $C_4$–$C_{10}$ diene. Examples of α-olefins and $C_4$–$C_{10}$ dienes are those already given for component (A). Particularly preferred elastomeric polymers are the ethylene/propylene/2-ethylidene-5-norbornene terpolymers containing from 25 to 70% by weight of propylene, and from 4 to 10% by weight of 2-ethylene-5-norbornene.

The compositions of the present invention are prepared by a process comprising a dynamic cross-linking step consisting of subjecting components (A) and (B) to mixing at a temperature higher than or equal to their softening or melting point, in the presence of the cross-linking agent, that can be added before, during or after the first mixing step, continuing said mixing throughout the cross-linking step. During the mixing step one obtains a fine dispersion of component (B) in component (A). Preferably, component (B) is dispersed in the form of particles having a diameter ranging from 0.5 to 1 micrometer. The cross-linking agent can be added before, during, or after the above mentioned mixing stage. The mixing can occur in an internal mixer, in an extruder, or in a system comprising an internal mixer and an extruder. The operation can also take place by using a number of machines placed in series, where the intimate mixing and homogenization of the compositions occurs in the first machine, and the cross-linking occurs in the others, always under mixing conditions. Mineral fillers, carbon black, dyes, plastifiers, stabilizing agents, extender oils, and other conventional additives which are typically used in unsaturated elastomeric olefin polymer compositions, can be present in the composition that is subjected to mixing and dynamic cross-linking.

The cross-linking step is carried out at temperatures preferably ranging from 170 to 230° C., by way of adding a free radical generator preferably consisting of an organic peroxide.

The free radical generator is preferably added in quantities ranging from 0.1 to 10% by weight, more preferably from 1% to 5% by weight with respect to the sum of components (A) and (B).

Examples of peroxides that can be used as free radical generators are: 1,1-bis(tert-butylperoxy)3,5,5-trimethyl cyclohexane; tert-butylperbenzoate; 2,2-bis(tert-butylperoxy)butane; dicumyl peroxide; di-tert-amyl peroxide; di-tert-butyl peroxide; 1,3-bis(tert-butylperoxy isopropyl)benzene. The cross-linking action can also be supported by the addition of cross-linking coagents, such as: trialyll cyanurate; triallyl isocyanurate; maleimides; allyl acrylates; divinylbenzene; polybutadiene, and benzoquinone dioxime.

Particularly indicated for this purpose are some unsaturated furfuryl aldehyde condensation products with hydrazine, acrolein; acetone, acrylamide or acrylonitrile, such as: i-difurfuralaldazine; 3(α-furyl)acrolein; 1,5-difurfuryl-1,4-pentadiene-3-one; 3-(α-furyl)acrylamide; 3-(α-furyl)acrylonitrile. The preferred compound is the difurfuralaldazine.

Preferably, the cross-linking coagents are added in quantities ranging from 5% to 60% by weight with respect to the free radical generator.

The following examples are given in order to illustrate and not limit the present invention.

EXAMPLES 1–4

The following polymers are introduced in a BRABENDER PLASTI-CORDER PLD651 internal mixer in the quantities specified in Table 1 as percentages by weight:

U-PP 1: propylene/1,3-butadiene copolymer containing 3.96 by weight of butadiene (2% as 1,2 monomeric units, and 1.9% as 1,4 monomeric units) corresponding to 36 in moles of unsaturation, and having an intrinsic viscosity [η]=2.3 dl/g (measured in tetraline at 135° C.), and fraction soluble in xylene at 20° C. of 6.9%;

U-PP 2: propylene/1,3-butadiene copolymer comprising 4.2% by weight of butadiene (2% as 1,2 monomeric units, and 2.1% as 1,4 monomeric units) corresponding to 3.2% in moles of unsaturation, and having an intrinsic viscosity [η]=2.3 dl/g measured in tetraline at 135° C.), and fraction soluble in xylene at 20° C. of 7.0%;

DUTRAL TER 536E2: ethylene/propylene/2-ethylidene-5-norbornene (ENB) terpolymer comprising 29% by weight of propylene and 8% by weight of ENB, extended with 50% by weight of oil and having a Mooney ML (1+4) viscosity at 125° C.=43.

The content was stirred for 3 minutes, then the extender oil and zinc oxide were added, and finally the PEROXIMON F40 [1,3-bis(tert-butylperoxyisopropyl)benzene peroxide] and the VP3 difurfuralaldazine cross-linking coagent were added in the quantities shown in Table 1 as percentages by weight.

The mixing was allowed to continue for an additional 4 minutes, and the content was then discharged. The following determinations were made on the product thus obtained (as reported in Table 1):

PROCESSABILITY.
  Determined by way of a SOMEF single screw extruder with an inside diameter of 15 mm, length/diameter ratio (L/D)=20, die diameter 2.5 mm, operating at 230° C. and with a flow rate of 9.5 cm³/min. The head pressure is measured in MPa.

COMPRESSION SET.
  Determined by ASTM D-395, measured on specimens maintained at 100° C. for 22 hours.

TABLE 1

|  | 1 | 2 | 3 | 4 |
|---|---|---|---|---|
| U-PP 1 | 6.50 | 6.50 | 6.50 | 6.50 |
| U-PP 2 | 6.50 | 6.50 | 6.50 | 0.50 |
| Dutral TER 537 E2 | 64.00 | 64.00 | 64.00 | 64.00 |
| Extender oil | 8.00 | 8.00 | 8.00 | 8.00 |
| Zinc Oxide | 9.00 | 10.40 | 9.22 | 8.07 |
| Peroximon F40 | 6.00 | 4.00 | 5.00 | 6.00 |
| VP3 | — | 0.60 | 0.78 | 0.93 |
| Pressure (MPa) | 8.5 | 16.0 | 17.5 | 18.5 |
| Compress.set % | 17 | 15 | 9 | 8 |

EXAMPLES 5–8

Using the blending and cross-linking methods described in Examples 1–4, but substituting the U-PP 2 unsaturated polypropylene with MOPLEN S30G propylene homopolymer (saturated), having an intrinsic viscosity [η] 2.3 dl/g one obtains the compositions set forth in Table 2 (wherein the quantities are percentages by weight).

TABLE 2

|  | 5 | 6 | 7 | 8 |
|---|---|---|---|---|
| U-PP 1 | 6.50 | 3.90 | 6.50 | 3.90 |
| MOPLEN S-30-G | 6.50 | 9.10 | 6.50 | 9.10 |
| Dutral TER 537 E2 | 64.00 | 64.00 | 64.00 | 64.00 |
| Extender oil | 8.00 | 8.00 | 8.00 | 8.00 |
| Zinc Oxide | 9.22 | 9.22 | 8.07 | 8.07 |
| Peroximon F40 | 5.00 | 5.00 | 6.00 | 6.00 |
| VP3 | 0.78 | 0.78 | 0.93 | 0.93 |
| Pressure (MPa) | 14.5 | 12.5 | 15.0 | 13.5 |
| Compress.set % | 11 | 14 | 10 | 13 |

EXAMPLES 9–12 (COMPARISON)

Using the blending and cross-linking methods described in Examples 1–4, but substituting completely the U-PP 1 and U-PP 2 unsaturated polypropylenes with -saturated MOPLEN S30G propylene homopolymer, having an intrinsic viscosity [f]=2.3 dl/g, one obtained the compositions set forth in Table 3 (wherein the quantities are percentages by weight).

The drastic deterioration of the elastic properties expressed in terms of compression set can be seen in this table.

TABLE 3

|  | 9 | 10 | 11 | 12 |
|---|---|---|---|---|
| MOPLEN S30G | 13.00 | 13.00 | 13.00 | 13.00 |
| Dutral TER 537 E2 | 64.00 | 64.00 | 64.00 | 64.00 |
| Extender oil | 8.00 | 8.00 | 8.00 | 8.00 |
| Zinc Oxide | 9.00 | 10.40 | 9.22 | 8.07 |
| Peroximon F40 | 6.00 | 4.00 | 5.00 | 6.00 |
| VP3 | — | 0.60 | 0.78 | 0.93 |
| Pressure (MPa) | 3.5 | 8.0 | 8.5 | 8.5 |
| Compress.set % | 31 | 28 | 26 | 25 |

EXAMPLES 13–14 (COMPARISON)

Operating as in examples 1–4, other types of cross-linking agents were used. In particular, a sulfur/accelerators based formulation was used together with one based on phenolic resin. In Example 13 the vulcanization was carried out at 170° C. for 15 minutes; in Example 14 the cross-linking was carried out at 215° C. for 6 minutes.

From the results reported in Table 4 wherein the quantities are percentages by weight, it can be seen that both cross-linking formulations tested were less effective than the one based on peroxide/VP3, and that the compression set values are considerably worse.

TABLE 4

|  | 13 | 14 |
| --- | --- | --- |
| U-PP 1 | 6.50 | 6.50 |
| U-PP 2 | 6.50 | 6.50 |
| Dutral TER 537 E2 | 64.00 | 64.00 |
| Extender oil | 8.00 | 8.00 |
| Zinc Oxide | 10.00 | 11.00 |
| Stearic acid | 1.00 | — |
| Tetramethylthiuram monosulfide | 1.50 | — |
| 2-mercaptobenzothiazole | 0.75 | — |
| Sulfur | 1.50 | — |
| Titanium dioxide | 0.25 | — |
| Schenectady SP 1045 phenolic resin | — | 3.60 |
| p-toluenesulfonic acid | — | 0.40 |
| Pressure (MPa) | 11.5 | 11.5 |
| Compression set (%) | 29 | 26 |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A thermoplastic elastomeric composition consisting essentially of:

A) from 10 to 80% by weight of at least one crystalline polymer of propylene containing from 0.05 to 15% in moles of ethylenic unsaturation and having an isotactic index greater than 70%, or a mixture of the above polymer with a saturated thermoplastic olefin polymer in quantities lower than or equal to 80% by weight of (A);

B) from 20 to 90% by weight of an amorphous, unsaturated elastomeric olefin polymer;

said composition having been dynamically cross-linked with a cross-linking agent comprising a free radical generator, and wherein said ethylenic unsaturation is incorporated into said crystalline polymer by reacting propylene with at least one diene selected from the group consisting of 1,3-butadiene, isoprene, 1,3-pentadiene, 1,4-hexadiene, dicyclopentadiene and 2-ethylidene-5-norbornene.

2. The thermoplastic elastomeric composition of claim 1, wherein the free radical generator is an organic peroxide.

3. The thermoplastic elastomeric composition of claim 1, wherein component (B) is an ethylene/propylene/2-ethylidene-5-norbornene terpolymer containing from 25 to 70% by weight of propylene and from 4 to 10% by weight of 2-ethylidene-5-norbornene.

4. A process for the preparation of the thermoplastic elastomeric composition of claim 1, comprising a dynamic cross-linking step consisting of subjecting components (A) and (B) to mixing at a temperature higher than or equal to their softening or melting point, in the presence of a cross-linking agent, continuing said mixing during the cross-linking step.

* * * * *